March 17, 1970  W. KAETHER ET AL  3,501,345
APPARATUS AND METHOD FOR THE CONTINUOUS EXTRACTION
OF SUGAR FROM BAGASSE Filed Dec. 14, 1965  5 Sheets-Sheet 1

United States Patent Office 3,501,345
Patented Mar. 17, 1970

3,501,345
APPARATUS AND METHOD FOR THE CONTINUOUS EXTRACTION OF SUGAR FROM BAGASSE
Willy Kaether, Braunschweig-Melverode, and Walter Dietzel, Braunschweig, Germany, assignors to Braunschweigische Maschinenbauanstalt, Braunschweig, Germany
Filed Dec. 14, 1965, Ser. No. 513,691
Claims priority, application Germany, June 4, 1965, B 82,267
Int. Cl. C13d 1/12
U.S. Cl. 127—5                         19 Claims

ABSTRACT OF THE DISCLOSURE

Apparatus for the continuous extraction of sugar from bagasse includes a stationary diffusion trough having side walls and a perforated bottom wall; conveyor means having a carrying surface displaceable along and above the perforated bottom wall for transporting the bagasse from the inlet to the outlet end of the trough; means for spraying the layer of bagasse with liquid in its passage through the trough; pressure applying means located downstream of the spraying means, the pressure applying means, which is spaced from the trough bottom to permit the discharge of bagasse as a consolidated cake layer, extending transversely of the trough walls at the outlet end as to form an end closure sealing the trough against outflow of liquid, the trough bottom extending upwardly to prevent outflow of liquid at the inlet end, and discharge means located at the outlet end of the trough and spaced from the pressure applying means, the discharge means including a horizontal shredding roll for discharge of the cake layer from the trough.

---

The invention relates to an extraction apparatus for bagasse, in which comminuted sugar cane is passed along an elongated diffusion trough, in which it is treated by extraction liquid on the countercurrent principle.

In known devices the comminuted sugar cane is fed from a filling hopper to the bottom of the diffusion trough, which is constructed as a screen and beneath which is a row of collecting tanks, in which the extraction liquid passing through the layer of bagasse is collected, the tanks extending over the entire width of the trough and throughout the extraction zone, which extends from the inlet to the outlet end of the trough.

Circulation of the extraction liquid is by means of pumps which draw off the liquid as it collects in the tanks and return it to spray nozzles arranged above the trough, the several nozzles being situated upstream of the respective tanks from which they draw liquid.

At the outlet end of the trough the extraction material is sprayed with fresh water, the resultant liquor which is collected in the last tank of the series adjoining the outlet end, being recirculated by connecting the draw-off pump of that tank to the spray nozzle or nozzles located above that area of the trough, beneath which the second from last tank is situated. In this manner it is possible to arrange for the extraction liquid gradually to permeate through the filling layer and thence through the screen when it will collect in the second tank, from which it is pumped off by a circulating pump associated with the latter and then sprayed on to the extraction material passing over the third tank. In this way the extraction liquid passes from tank to tank and from spray nozzle to spray nozzle until it reaches the inlet end, where it attains its highest concentration, while the concentration of sugar in the extraction material decreases in the direction of transport.

The extraction material may be moved along the trough, the bottom of which is constructed as a stationary screen, by means of conveyor elements. Conveyor elements in the form of vertically disposed walls are for example known, the walls subdividing the trough into individual chambers and being connected together in the lengthwise direction of the trough by chains by which the walls are moved through the trough, the walls extending from the level of the screen to a point near the upper edge of the diffusion trough.

Conveying devices consisting of individual arms and moved by chains lengthwise of the trough are also known, but such arms extend over only a relatively small part of the height of the trough. Conveying elements of this type are generally disposed in each case near the frictional centre of gravity of the extraction material, while the friction surfaces are formed by the walls and sieve bottom of the trough. The frictional centre of gravity normally occurs at a height about a third of the depth of the extraction bed, so that conventional conveying elements are disposed approximately at this height. This has the disadvantage that in order to keep the screen clean it is desirable for the conveying elements to be disposed as close as possible to the surface of the screen.

Known diffusion troughs for treatment of sugar cane are usually 30 to 40 metres in length, while whereas the length of the trough depends on the residual sugar content of the bagasse which is desired in each case. The tendency is to endeavour to reduce the residual sugar content of the bagasse to a minimum. The comminuted sugar cane is therefore charged to a depth of up to 1.8 metres or more in the trough and in its travel there-through is traversed some 20 times by the extraction liquid.

On discharge from the trough, the extraction material is passed by conveyor belt to at least two triple roll water extraction mills, by which the moisture content of the bagasse is reduced to such an extent that it is in a condition for immediate burning. Due to the high pressures at which such extraction mills operate driving motors of 1000 HP are necessary. In addition, they require extensive maintenance because of their heavy loading and their method of working. Another feature of conventional sugar cane diffusion troughs which impairs their economical working is due to their considerable overall length, which involves heavy capital outlay for the buildings, or failing which the diffusion troughs are too long to incorporate in existing plants.

The ability to increase the cross-section of the trough at the expense of its length, and in particular to obtain a substantial increase in its width was limited by the constructional features of the water extraction mills. Mills of this type, which consist essentially of three horizontal rolls, can only be built up to a certain width, which thus limits the width of the trough.

In order to reduce the length of the trough attempts have been made to make the latter wider than the associated water extraction mills. Practice has shown that increased trough widths in excess of about 15% is possible, due to the fact that efficient removal of water from the extraction material in the extraction mills can be achieved only when the bagasse cake has a uniform width equal to that of the rolls. When the diffusion trough has a greater width than the mill or rolls, the mills will unavoidably receive a greater quantity of extraction material at their outer ends, so that the extraction material will be only incompletely pressed.

Another disadvantage of conventional extraction devices results from the fact that the water content of the extraction material leaving the trough is so high that the low residual moisture required for subsequent burning of the bagasse material can be obtained only by using as many as two or three mills.

Finally, an extraction apparatus is also known in which in order to increase its efficiency a plurality of horizontal pressure rolls, the axles of which are mounted in the walls of the trough, are disposed in the last part of the extraction zone, that is to say up-stream of the outlet of the trough. These pressure rolls are of small diameter and in each case are disposed beneath or between the spray nozzles, so that through partial squeezing-out of the extraction liquid, together with the simultaneous spraying of the latter by the spray nozzles disposed in the region of the rolls, they contribute towards limited intensification of the extraction process.

All known extraction plants have in addition the disadvantage that the extraction trough is open at both ends. Owing to the fact that at the charging end the trough is open at least to the upper edge of the conveyor and at the discharge end is open at least to a depth equal to that of the layer of bagasse, flooding frequently occurs when the extraction liquid is temporarily prevented from filtering through the bed of extraction material, particularly when pressure rolls are disposed in the last parts of the extraction zone or of the trough. The extraction liquid which accumulates in the trough then flows out at the charging end and to a still greater extent at the outlet end, which is generally completely open.

In order to reduce the number of water extraction mills necessary to obtain the desired residual moisture content of the bagasse and in order to increase their efficiency despite the fact that the width of the trough is considerably increased in relation to that of the rolls, and in addition in order to achieve effective closing of the two ends of the diffusion trough, the extraction apparatus according to the invention is so constructed that at the charging or inlet end the screen forming the bottom of the trough extends upwardly and the first roller, referred to the direction of transport, is situated downstream of the last nozzle in the extraction zone and is constructed as a pressure applying rolls also to apply a closure by sealing off the diffusion trough at the outlet end, while between each of the rolls a slide shoe is disposed.

A horizontal stripping and throwing roll, may be disposed at the outlet end, followed by guide boards arranged at an angle to one another.

According to a further feature of the invention the closure and pressure roll is disposed directly in advance of the outlet end of the diffusion trough and the stripping and throwing roll.

As applied to the pressing of bagasse layers having a depth of 1.2 metres or more above the screen, the extraction liquid squeezed out of the upper part of the charge layer is forced to pass through the entire bagasse layer. In order to travel this distance, the extraction liquid requires a certain period of time, to which the entire pressing time, that is to say the time during which the bagasse layer is under the influence of the rolls, must be related. According to the invention use is therefore advantageously made of a plurality of rolls, one of which serves to close the diffusion trough. Downstream of the closure and pressure roll, or between each two rolls, slide shoes are disposed to prevent re-expansion of the bagasse cake or leaving the gap between the roll and the screen, and thereby absorbing extraction liquid.

The arrangement of the rolls, which in according with the invention, are downstream of the extraction zone, results in the extraction material, which has a depth of about two metres in the diffusion trough, is often compressed to the extent of 50%. In consequence of this intensive pressing in the preliminary extraction of water, it is possible from the outset to work with a greater depth of layer. An increased depth of layer obviously leads to a greater throughput, so that the economy of the apparatus is increased to a not inconsiderable extent.

In addition, the preliminary extraction of water from the extraction material by the rolls disposed downstream of the extraction zone makes it possible to dispense with one or even two costly water extraction mills, together with their drives and gear trains, which would otherwise be disposed downstream of the diffusion trough and which, as is well known, require frequent maintenance.

Moreover, in consequence of the considerable reduction in depth of the layer of extraction material resulting from the rolls, and of the consequent homogenisation of the extraction material, which would otherwise be in loose form, a rapidly rotating stripping and throwing roll, is disposed at the outlet end of the trough. Because of its high peripheral speed this roll effects intensive acceleration and regular distribution of the homogenised extraction material leaving the trough.

As a result of the high speed of travel of the outgoing extraction material, obtained by means of the stripping and throwing roll, the trough may itself be made substantially wider than the water extraction mills adjoining it. Furthermore the guide boards disposed downstream of the stripping and throwing roll distribute the extraction material over a conveyor belt extending between the trough and the water extraction mill in such a manner that despite the substantially wider diffusion trough a regular distribution of the material over the width of the water extraction mill is achieved. The combination of preliminary water extraction by means of the closure and pressure rolls with the stripping and throwing roll disposed downstream thereof enables the diffusion trough to be shortened to half the usual dimensions, so that the ratio of the trough width to the width of the water extraction mill following it can be increased to 2:1 or more.

Simultaneously with the preliminary water extraction, the closure and pressure roll and the upward inclination of the screen at the charging end result in effective closure of the diffusion trough so that the danger of overflowing is eliminated.

When the pressure roll is disposed directly in advance of the outlet end of the trough, a screening roll may advantageously be disposed beneath the latter, the peripheral walls of which roll rotate in the plane of the trough bottom and which may if desired also serve as a drive or guide roller for the conveyor chains. In one particular embodiment of the invention, for example in the case of extraction material which is difficult to handle, preliminary extraction of water may also be effected by means of a caterpillar chain extending around the rolls, the distance between the latter and the bottom of the trough decreasing in the direction of the outlet. The bottom of the trough at the outlet end may also consist of rolls around which another caterpillar chain extends.

In order to achieve adequate preliminary extraction of water by the rolls, different pressures are necessary in dependence on the ripeness and growth as well as on the type of the sugar cane or the bagasse subjected to extraction. When conditions are unfavourable the pressing pressures required may be so great that the friction on the stationary screen assumes values which no longer permit operatonally reliable transport of the compressed bagasse. According to the invention the portion of the trough bottom, in itself stationary, which (in the region of the rolls) is beneath the upper side of the conveyor chains is constructed as a rotating screen belt, so that the driven screen belt moves along beneath the conveyor chains, which are likewise in motion, with the result that in the region of the rolls the sliding friction is replaced by rolling friction. Viewed in the direction of transport, the two guide rolls for the moving screen are situated before the guide roll of the main drive for the conveyor chains. Through this arrangement the expensive construction of a moving screen movable over the entire length of the trough is avoided.

The apparatus of this invention gives particularly good results when the diffusion trough is charged with an extraction material of varying consistency, or when the type of extraction material does not permit pressing by means of water extraction mills. In addition, the compressability of the extraction material frequently varies within wide limits, or there are considerable irregularities in the extraction material. These difficulties can be overcome by mounting the pressure roll in a swivelling fork. The effectiveness of the pressure roll may in addition be increased by providing it with an out-of-balance weight or with a vibrator and driving it through a motor, for example mounted on the fork, or by the action of the roll of the piston rod of a hydraulic cylinder. In addition to the static pressure component, a dynamic component is thus produced which effects a further reduction in the moisture content of the bagasse.

However, according to the invention the rolls may also be constructed to give a screening effect by the use of perforated cylinders, the rolls being mounted in a common chassis, which is pivotally suspended, the chassis which is connected to a pressure ram, having lateral guide means.

The damming of liquid effected by the rolls may be so great that in order to avoid overflowing for this and other reasons, the pressure roll may be divided radially into three chambers or compartments, the inner chamber, when full serving as ballast chamber while the other two and outer chambers, which have open sides function as collection chambers for liquid between the side walls of the trough and the roll, the liquid in these two outer chambers being extracted by means of a pump, the suction line of which extends to the bottom of each chamber. In addition, according to the invention the side walls of the diffusion trough upstream and in the region of the rolls may be perforated in order to give an additional screening effect by allowing the extraction liquid to pass out of the trough on all sides.

By designing the closure and pressure roll to introduce a screening effect it follows that part of the extraction liquid by-passes the main filter screen and passes out through the roll and therefore will not pass through the layer of bagasse. In this case the closure and pressure roll is not subdivided into three chambers. In all cases however, part of the extraction liquid may be by-passed by pumping it off from the outer chambers of a three-chamber pressure roll or from the pressure roll itself when constructed as a perforated cylinder. To facilitate the conveying of the layer of bagasse and to obtain better flowing of the stream of bagasse beneath the rolls, the latter are preferably provided with ribs, projections, or the like.

Where the rolls are driven the preliminary removal of water can be made more effective according to the invention by varying the relative peripheral speeds of the several rolls or controlling their speeds such that they are alternately higher and/or lower than the speed of travel of the conveyor or of the moving layer of bagasse. This results in intensive rearrangement and internal friction in the layer of bagasse, and experiments have shown that this leads to intensification of the pressing action.

Since in the apparatus according to the invention the conveyor acts on the extraction material in the lower section of the layer of bagasse and in addition, the rolls exert a conveying action of the upper layer, despite the increased depth of the charge layer, the conveyor can be disposed at a substantially lower position in the layer of bagasse and closer to the screen, so that, either alone or in co-operation with the extraction material situated directly beneath the conveyor means, they serve to clean the sieves. The ratio of the height of the layer of bagasse beneath the pressure roll to the height of the upper edge of the conveyor members above the screen is advantageously greater than three.

In order to support the pressures bearing onto the conveyor in the region of the rolls and to prevent premature wear thereon, the conveyor in its passage beneath the rolls may be guided by means of a plurality of support rollers which serve as supports, for example, of the chains between which the individual conveyor members extend.

According to a further feature of the invention the diffusion trough comprises upper and lower sections or zones in which the outlet end of the upper section of the trough is connected by a vertical shaft to the charging end of the lower section, a closure and pressure roll and and a stripping and throwing roll being provided at the outlet end of the upper section and a pressure roll at the charging end of the lower section of the trough.

Experiments have shown that with a uniform depth of the bagasse layer over the entire width of the diffusion trough, the through-flow of the extraction liquid in the region of the trough walls is greater than in the middle portion of the bagasse bed. This results in irregular extraction over the width of the diffusion trough. To overcome this, provision may be made according to this invention, to vary the amount of bagasse or other material delivered to the diffusion trough in such a manner that the depth of the bagasse layer is greater at the centre than at the sides of the trough.

The invention is illustrated in the accompanying drawings, in which.

Figure 1:
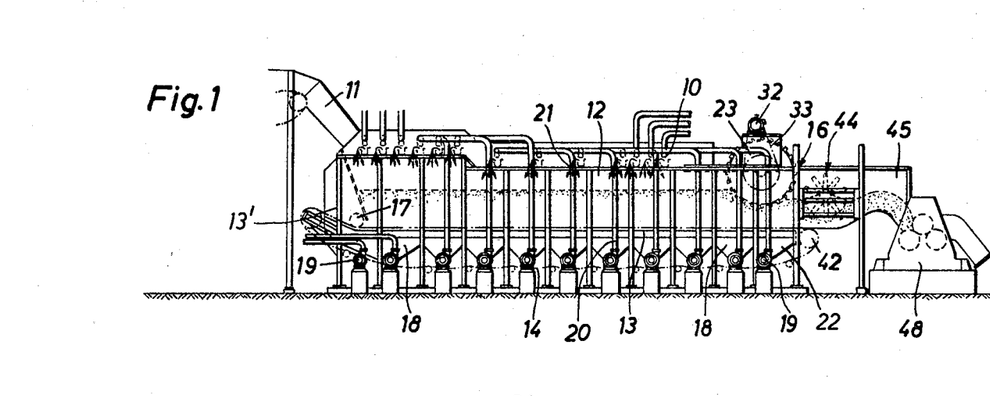
FIGURE 1 is a side elevation of an extraction apparatus according to the invention.
Figure 2:
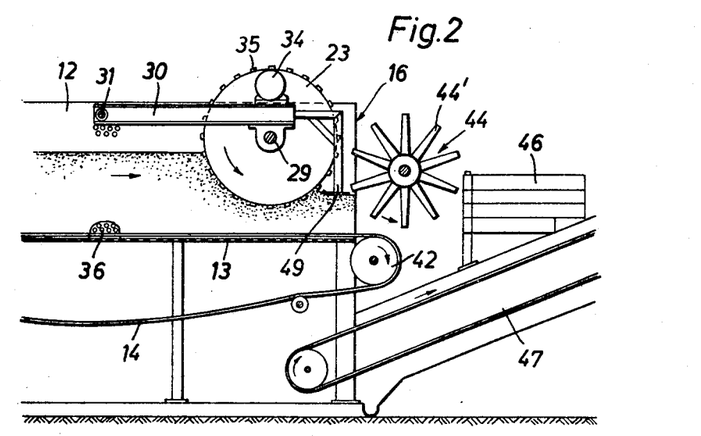
FIGURES 2 and 3 are respectively an elevation and plan view on an enlarged scale of the outlet end of the diffusion trough shown in FIGURE 1, with the preliminary extraction of water and having a closure device according to the invention.
Figure 3:
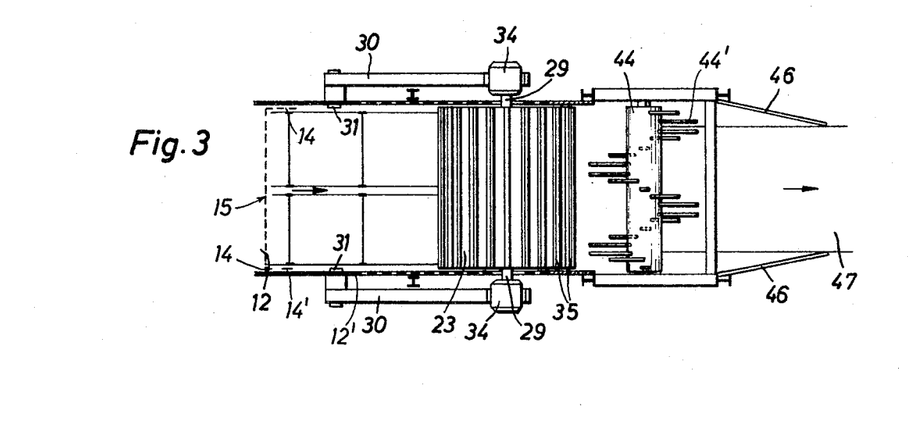
Figure 4:
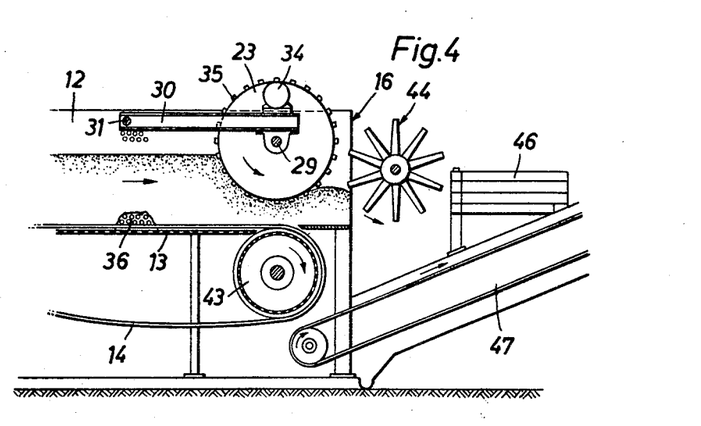
FIGURES 4 to 6 are views corresponding to FIG. 2 of alternative constructions of the apparatus according to the invention.

Referring to FIGURES 1–3 the extraction apparatus of this invention comprises a diffusion trough 12 into which the comminuted sugar cane is continuously filled through a hopper 11. The bottom of the diffusion trough 12 consists of a stationary screen or sieve 13, which on the charging side, that is to say below the trough 11, is extended upwardly at an angle at 13'. Movement of the sugar cane i.e. the bagasse over the screen 13 is by means of an endless chain conveyor 14 which includes a number of conveyor bars 15 extending transversely between the two chains. The conveyor 14 moves the bagasse at a constant speed of travel over the screen 13 to the outlet end 16 of the trough 12.

At the inlet or charging end the conveyor chains 14 pass beneath a guide or pressure roller 17 so that the conveyor bars 15 are caused to slide over the inclined portion 13' of the screen 13. Continuous scraping and thus cleaning of the surface of the screen is thus achieved, this cleaning action being necessary should bagasse accidently reach this part of the screen bottom which serves only to close the trough with the result that any danger of spilled bagasse caking thereon is eliminated.

Beneath the screen 13 are a series of tanks 18, 22 arranged side by side to extend over the entire length and width of the trough, in which tanks the extraction liquid filtering through the layer of bagasse collects. Associated with each tank 18 is a pump 19, by which liquid collecting in the tank is continuously circulated through pipes 20 to spray delivery nozzles 10, 21.

Figure 5:
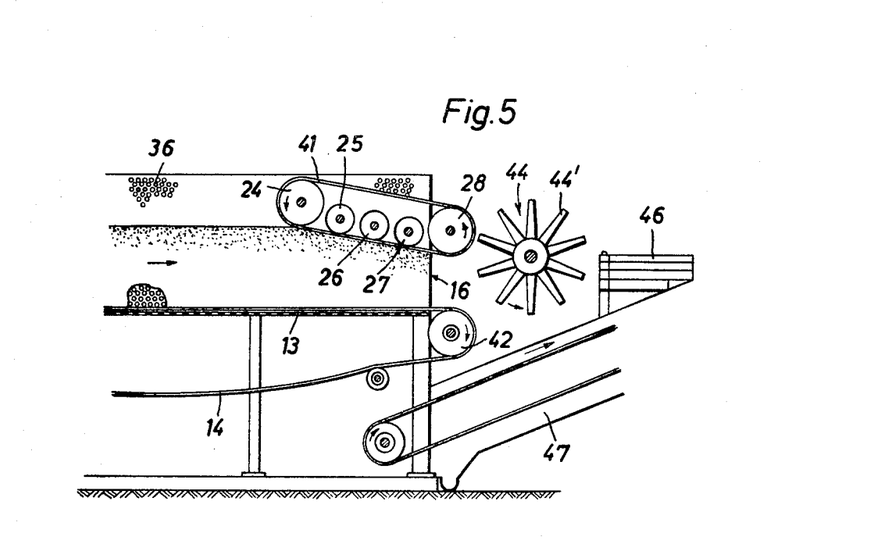
Figure 6:
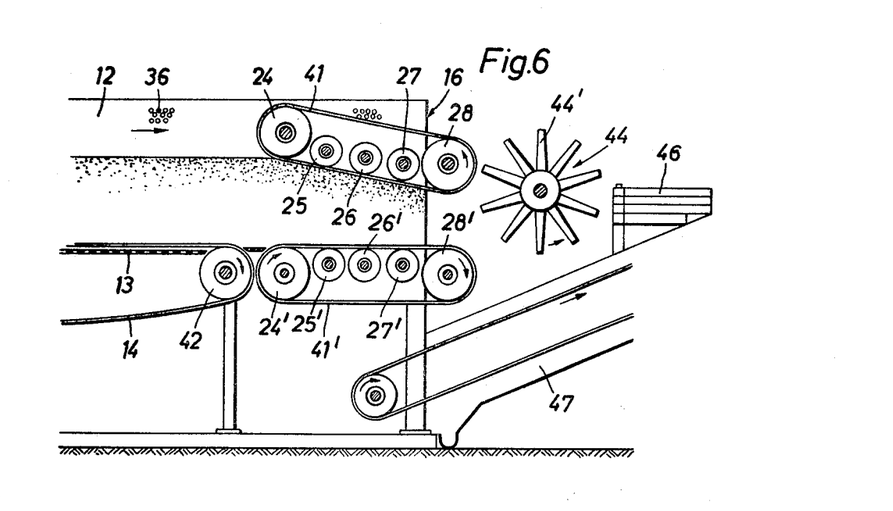

The nozzles 10, 21 are distributed over the entire extraction zone of the trough 12 and in each case, viewed in the direction of transport, lie upstream of the pumps 19 or tanks 18 from which they are fed. The extraction zone, that is to say the part downstream of the last nozzle 10, 21, is followed by a preliminary water removal system, in which the layer of bagasse is no longer treated with extraction liquid. In this water extraction zone, the side walls of the trough walls 12 are perforated as indicated at 12' (FIG. 3) and pressure is applied by a pressure roll 23 (FIGS. 1–4) or by a plurality of rolls 24, 25, 26, 27, 28 (FIGS. 5–6).

At the end of the extraction zone, the bagasse is treated with pure water which percolates through the extraction material, washes out any residual sugar still present, and collects in the tank 18 beneath. Since the extraction liquid is in turn pumped off from this tank and fed back into the diffusion trough 12 above one of the tanks situated upstream of it, the concentration of sugar in the extraction liquid continuously increases from tank to tank, until in the last tank situated at the charging or input end, the concentration reaches a maximum. During its travel through the diffusion trough the bagasse is thus subjected to increasing extraction treatment in countercurrent, until it leaves the diffusion trough 12 at 16.

The tanks 18, 22 in the preliminary water removal zone also feed nozzles 10 which are situated in the extraction zone and which are disposed in accordance with the concentration of the extraction liquid drawn off from said tanks.

The pressure roll 23, which is located immediately in advance of the outlet end 16 of trough 12, is on an axle 29 mounted in a two-armed swinging frame 30. The frame 30 is mounted to pivot about spindles 31 in the walls of the trough. Drive is imparted to pressure roll 23 through a belt drive 33 from a motor 32 (FIG. 1) while a variator (not illustrated) may also be provided, by means of which a pulsating peripheral speed of the roll 23 is achieved. In this way a rearrangement is obtained in the layer of bagasse and leads to intensification of the pressing action. In order to increase still further the effectiveness of the water extraction by the roll 23, vibrators 34 are carried one on each arm of the frame 30.

On the surface of the roll 23 are parallel axially extending ribs 35, which serve to accelerate the bagasse cake in its passage beneath the roll. Through this additional conveying action of the roll 23 it is possible for the conveyor bars 15 to be reduced in depth and to be disposed closer to the screen than in conventional extraction apparatus, so that they simultaneously serve to clean the screen. The actual height of the conveyor bars 15 depends essentially on the depth of the compressed bagasse layer beneath the rolls.

To ensure adequate discharge of the extraction liquid from the bagasse in the preliminary water removal zone, apertures 36 are provided in the side walls of the trough, the side walls of the tank 22 situated in the region of the rolls being raised to the level of the uppermost row of holes 36, so that they completely enclose this portion of the trough wall and collect the liquid passing through holes 36.

Figure 7:
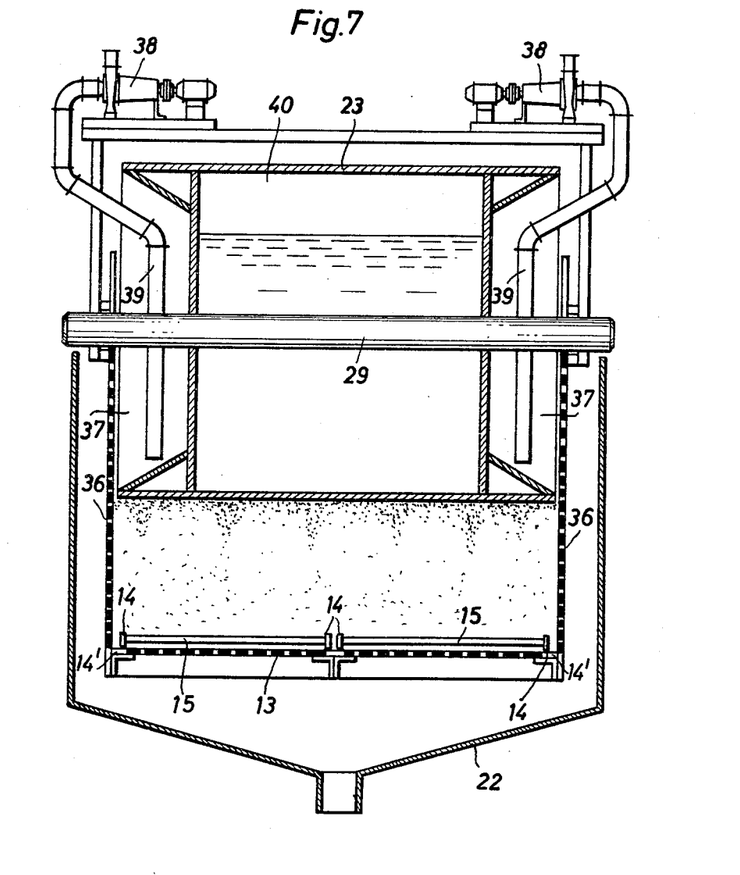
FIGURE 7 is a vertical section through the closure and pressure roll disposed in a diffusion trough of the type illustrated in FIGURE 1.

In consequence of the action of the roll 23 on the bagasse layer, a not inconsiderable part of the extraction liquid pressed out passes through the gap formed between the trough wall and the end faces of the roll 23 into the two outer chambers 37 provided by the end recesses in (FIG. 7) the roll, whence it is drawn off by pipes 39 connected to motor driven pumps 38. The central chamber 40 of the roll 23 can be filled with ballast, e.g. water. The pressure roll 23 may however also be constructed with a perforated cylinder to produce a screening action in which case it is not subdivided into three chambers, only one suction pipe if necessary being provided to draw off the liquid entering the roll, which thus operates as a by-pass of the main filtration through the screen 13.

In every case however the trough is effectively closed by the pressure roll 23 occupying the upper portion of the trough and by the compressed layer of bagasse thereunder beneath, so that overflowing is prevented.

In place of a single roll 23, a series of rolls 24, 25, 26, 27, 28 (FIGURE 5) encircled preferably by a caterpillar chain 41 may be provided in the water removal zone, the distance of the chain from the screen 13 decreasing towards the outlet end 16. The cylinders of the rolls may be perforated and in particular may also be disposed in a common, movably suspended and laterally guided chassis, which if desired may be connected to a ram device 58 in order to increase the pressure applied to the bagasse.

As shown in FIG. 6 the end portion of the trough bottom may be replaced by rolls 24′, 25′, 26′, 27′, 28′, encircled by a similar caterpillar chain 41, the guide roller 42 for the conveyor chains 14 being positioned further back. Likewise the guide rollers 42 may be replaced by a cylindrical screen or perforated roll 43 (FIG. 4), the plane of rotation of roll 43 coinciding with the trough bottom or screen and the axes of this roll 43 and axis 29 of pressure roll lying in the same vertical plane.

The conveyor chains 14 are slidably supported on guide surfaces 14′ (FIG. 7) lengthwise of the trough. Tests have shown that the frictional loading of the conveyor chains 14 due to the layer of bagasse thereon up to a height of two metres is only slight. In the region of the pressure roll or rolls however the high surface pressure may lead to relatively rapid wear of the conveyor chain or of individual links thereon. To overcome this series of support rollers 59 may be disposed approximately below the rolls and slight above the screen to relieve the conveyor chains of excessive frictional wear.

Downstream of the outlet end 16 of the trough 12 there is disposed a break down or stripping device consisting of a revolving element 44 having staggered stripping arms 44′, which break up the bagasse cake on discharge from trough 12 and throw it in bunches into a collecting hopper 45 (FIGURE 1) or on to a conveyor belt 47 (FIGS. 2–4), between the guide boards 46 which extend at an angle to one another. The filling hopper 45 and the guide boards 46 secure uniform feeding of a three-roll mill 48 (FIG. 1) which is disposed downstream of the trough and in which the moisture content of the bagasse, which has already been partly freed of water by the rolls 23 to 28, 54 and 55, is reduced to such an extent that the residual moisture does not exceed the proportion permissible for direct combustion.

The provision of the stripping element 44 with the guide boards 46 or with the filling hopper 45, ensures that the bagasse cake on leaving the trough 12, and the width of which considerably exceeds the width of the three-roll mill 48 (FIGS. 1 and 8), is broken down and reformed into a new, loosened cake the width of which corresponds to the width of the three-roll mill 48. When use is made of the stripping element 44 and of the guide boards 46 or of the hopper 45, the width of the trough is therefore independent of the width of the water extraction mill following the trough, so that with the same or a higher throughput the width of the trough can be considerably increased with a reduction in its length. Since the material passing out of the gap between the rolls and the screen bottom has a tendency to expand due to the falling off of pressure applied to it, a pressure plate or shoe 49 (FIG. 2) or a series of plates 57 (FIG. 8) is disposed after each roll for the purpose of holding the cake approximately at the height of the gaps between the roll or rolls and the screen. The bagasse cake leaving the gap is thereby prevented from absorbing extraction liquid through expansion and thus partly obviating the preliminary water exaction action of the rolls.

Figure 8:
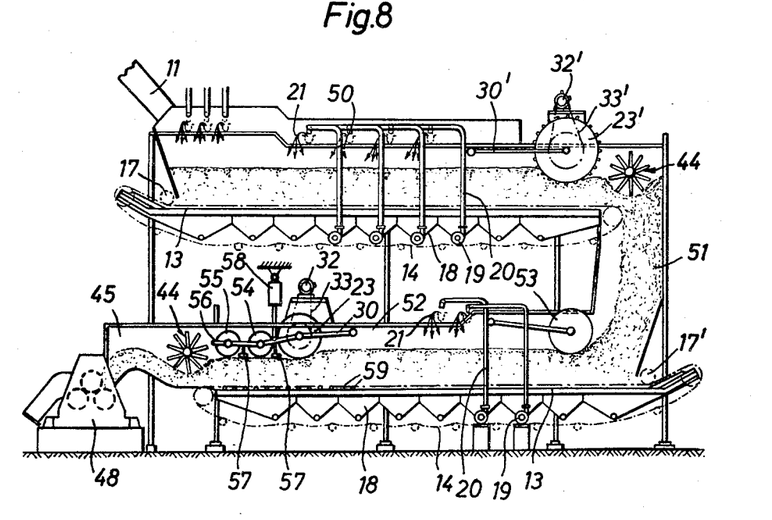
FIGURE 8 is a side elevation of a two-section extraction apparatus according to the invention.

The invention can also be carried out by effecting extraction in two separate extraction zones, as shown in the apparatus of FIG. 8 in which one extraction zone takes place in an upper trough 50, which is connected by a substantially vertical shaft 51 to a lower trough 52 constituting the second extraction zone. In this arrangement an additional pressure roll 23′ is disposed at the downstream end of the upper extraction zone and immediately upstream of the shaft 51, while a stripping roll element 44 is situated downstream of it or in the upper portion of the shaft 51.

The bagasse which has been subjected to partial extraction in the upper trough 50 and compressed by the roll 23' is broken up by the action of the roll 44 and thrown into the shaft 51. In consequence of the lower position of the axis of the roll 44' as compared with that of the roll 23', the layer of bagasse is subjected to intensive rearrangement, which has a favourable effect on the extraction.

Experience has shown that in its travel through the trough the bagasse is subjected to a certain compacting or compression by the extraction liquid issuing from the nozzles which are disposed at various points. This compaction of the bagasse layer has a favourable effect on the extraction because the formation of liquid channels, which are frequently formed when the bagasse is too loose and lead to irregular extraction is avoided. The rearrangement of the extraction material brought about by the action of roll element 44 which in itself has a favourable effect on the extraction, can at the same time give rise to formation of channels and hence to irregular extraction in the lower diffusion trough 52. To overcome this a pressure roll 53 is disposed at the inlet end of the lower diffusion trough 52, so that the latter is again subjected to a certain compression.

The second extraction zone extends from the pressure roll 53 to the closure and pressure roll 23 at the outlet end of the diffusion trough 52. Further rolls 54, 55 are disposed downstream of the roll 23 and together with the roll 23 are mounted in a common chassis 56 which is guided laterally in relation to the walls of trough 52. Between the two rolls 54, 55 is a slide shoe 57, the necessary pressure being obtained by a ram 58 acting on the chassis 56. The rolls 23, 54, 55 may be driven at different peripheral speeds in order to increase the pressing-lut action. Support rollers 59 are disposed beneath the rolls 23, 54, 55, immediately above the screen, in order to support the conveyor chain 14 in its movement along the bottom of trough 52. Apart from its two-part construction the trough illustrated in FIGURE 8 works in the same manner as the trough shown in FIGURE 1, corresponding parts being designated by the same references.

With the extraction apparatus according to the invention not only is effective closure of the two end faces of the diffusion trough achieved, but the preliminary removal of water, which is independent of the extraction, in the rear portion of the diffusion trough also enables the number of water extraction mills following the trough to be reduced. In addition, because of the rearrangement of the bagasse cake passing out of the trough end by the breaking up and throwing action of the roll 44 and by the filling hopper or the guide boards, the diffusion trough itself can be made substantially wider, or else in two storeys, and shorter than conventional diffusion troughs, the width of which was limited by the width of the rolls of the water extraction mills.

What we claim is:

1. In apparatus for the continuous extraction of sugar from bagasse, the combination comprising a stationary diffusion trough having side walls and a perforated bottom wall; conveyor means having a carrying surface displaceable along and above said perforated bottom wall for transporting the bagasse from the inlet to the outlet end of the trough; means for spraying the layer of bagasse with liquid in its passage through the trough; pressure applying means located downstream of the spraying means, said pressure applying means, which is spaced from the trough bottom to permit the discharge of bagasse as a consolidated cake layer, extending transversely of the trough walls at the outlet end as to form an end closure sealing the trough against outflow of liquid, the trough bottom extending upwardly to prevent outflow of liquid at the inlet end, and discharge means located at the outlet end of the trough and spaced from said pressure applying means, said discharge means including a horizontal shredding roll for discharge of the cake layer from the trough.

2. Apparatus as claimed in claim 1 in which the pressure applying means comprises a series of rolls.

3. Apparatus as claimed in claim 1 in which the pressure applying means comprises a series of rolls and an endless belt is supported by said rolls, the axes of the rolls being so arranged that the distance between the belt and trough bottom decreases in the direction of movement of the bagasse.

4. An apparatus as claimed in claim 1 in which the conveyor means terminates at a point in advance of the pressure applying means and is replaced by a series of rolls supporting an independent belt.

5. An apparatus as claimed in claim 1 wherein the diffusion trough is constructed in two superimposed sections, the outlet end of the upper section being connected through a vertical shaft to the inlet end of the lower section of the trough and in which at the outlet end of the upper section there is disposed a pressure applying means together with a shredding device, the inlet end of the lower section of the trough being provided with an additional pressure roll.

6. Apparatus according to claim 1 wherein said pressure applying means comprises at least one roll disposed upstream of said shredding roll, and including a screen roll having a peripheral surface in the form of a screen located below said pressure applying roll and said shredding roll and below said carrying surface of said conveyor means, said screen roll being rotatably mounted so that said peripheral surface thereof is substantially tangential to the plane of said perforated bottom wall of said trough.

7. Apparatus as claimed in claim 1 in which the pressure applying means comprises a roll having a diameter relatively large compared to the thickness of the bagasse layer.

8. Apparatus as claimed in claim 7 in which the discharge means also includes a pressure plate located between the pressure roll and the shredding roll for limiting the level of the bagasse layer in the space between said rolls.

9. Apparatus as claimed in claim 7 in which the pressure roll is mounted to revolve in a frame, the frame being suspended for pivotal movement about a horizontal axis extending transversely of the trough so that the frame is urged by gravity into engagement with the bagasse.

10. Apparatus as claimed in claim 9 and comprising means for imparting vibration to the pressure roll.

11. Apparatus as claimed in claim 9 in which power opearted means is carried on the frame for imparting drive to the pressure roll.

12. In apparatus for the continuous extraction of sugar from bagasse, the combination comprising a diffusion trough, said trough including an inlet end and an outlet end, and having side walls and a bottom wall, part at least of which is formed as a filter screen, hopper means for delivery of bagasse at the inlet end to the trough, conveyor means for transporting the bagasse from the inlet to the outlet end of the trough; means for subjecting the layer of bagasse to a liquid spray in its passage through the trough; liquid collecting means extending lengthwise of the trough and located beneath the filter screen, means for drawing off liqiud from said liquid collecting means and delivering it to said spray means, pressure applying means including a roll located downstream of the spraying means, said roll which is spaced from the trough bottom being so disposed between the trough walls at the outlet end so as to form and end closure sealing the trough against outflow of liquid, a frame within which the roll is journalled to revolve, said frame being pivotally suspended between said side walls, and discharge means at the outlet end of the trough including a horizontal shredding roll for discharge of the bagasse cake from the trough.

13. Apparatus as claimed in claim 12 in which the shredding roll delivers on to an endless conveyor, and guideboards are arranged on each side of the conveyor.

14. An apparatus as claimed in claim 12 in which the pressure roll is provided with a plurality of projections on the peripheral surface thereof.

15. An apparatus as claimed in claim 12 comprising a pressure roll subdivided radially into a central chamber and outer chambers and suction means connecting with the outer chambers for withdrawing liquid within the outer chambers.

16. An apparatus as claimed in claim 15 in which the side walls of the diffusion trough comprise a screening section.

17. A method for the continuous extraction of sugar from bagasse, which comprises feeding the bagasse into one end of a diffusion trough, having side walls and a bottom wall at least partly formed as a stationary filter screen, so that the height of the bagasse layer increases from the center of the diffusion trough towards the side walls, continuously moving the bagasse through the trough relative to the filter screen and subjecting it to a liquid spray to extract the sugar, collecting the filtered liquid and recirculating it through to the spray, subjecting the bagasse at the discharge end of the trough to pressure so as to form it into a compact mass by passing it beneath a roller member so disposed between the trough walls as to form an end closure sealing the trough against outflow of liquid, and finally subjecting the compacted mass to the action of a shredding device.

18. A method for the continuous extraction of sugar from bagasse, which comprises feeding the bagasse into one end of a diffusion trough, part at least of the bottom wall of which is formed as a stationary filter screen, continuously moving the bagasse through the trough relative to the filter screen and subjecting it to a liquid spray to extract the sugar, collecting the filtered liquid and recirculating it through to the spray, subjecting the bagasse at the discharge end of the trough to pressure so as to form it into a compact mass by passing it beneath a roller member so disposed between the trough walls as to form an end closure sealing the trough against outflow of liquid, and finally subjecting the compacted mass to the action of a shredding device, the bagasse being continuously moved through the trough on conveyor means travelling at a given rate, and which comprises positively driving said pressure roller member at a peripheral speed differing from the travel rate of said conveyor means.

19. Method according to claim 18 wherein the bagasse is passed beneath a plurality of roller members for compressing the bagasse into a compact mass, and which comprises driving said roller members alternately at peripheral speeds greater and lower than said given rate of travel of said conveyor means.

References Cited

UNITED STATES PATENTS

| 246,731 | 9/1881 | Davis | 100—118 X |
|---|---|---|---|
| 1,287,582 | 12/1918 | Durant | 100—118 X |
| 1,296,112 | 3/1919 | Peiler | 100—169 |
| 2,684,288 | 7/1954 | De Smet | 23—270 |

FOREIGN PATENTS

| 218,522 | 11/1907 | Germany. |
|---|---|---|
| 565,928 | 4/1958 | Belgium. |
| 1,341,722 | 9/1963 | France. |
| 1,378,132 | 10/1964 | France. |

JOSEPH SCOVRONEK, Primary Examiner

D. G. CONLIN, Assistant Examiner

U.S. Cl. X.R.

23—270; 100—153; 127—3, 6, 43, 45